United States Patent
Weder et al.

(10) Patent No.: US 6,775,949 B2
(45) Date of Patent: *Aug. 17, 2004

(54) FLORAL SLEEVE WITH A SKIRT

(75) Inventors: Donald E. Weder, Highland, IL (US); Joseph G. Straeter, Highland, IL (US)

(73) Assignee: Southpac Trust International, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 10/430,254

(22) Filed: May 6, 2003

(65) Prior Publication Data

US 2003/0233786 A1 Dec. 25, 2003

Related U.S. Application Data

(63) Continuation-in-part of application No. 09/760,877, filed on Jan. 16, 2001, now Pat. No. 6,598,340.

(51) Int. Cl.[7] .................................................. A01G 9/02
(52) U.S. Cl. .......................................................... 47/72
(58) Field of Search ............................................. 47/72

(56) References Cited

U.S. PATENT DOCUMENTS

| | | |
|---|---|---|
| 524,219 A | 8/1894 | Schmidt |
| 732,889 A | 7/1903 | Paver |
| 950,785 A | 3/1910 | Pene |
| 1,044,260 A | 11/1912 | Schloss |
| 1,063,154 A | 5/1913 | Bergen |
| 1,446,563 A | 2/1923 | Hughes |
| 1,520,647 A | 12/1924 | Hennigan |
| 1,525,015 A | 2/1925 | Weeks |
| 1,610,652 A | 12/1926 | Bouchard |
| 1,697,751 A | 1/1929 | Blake ........................ 229/87 |
| 1,794,212 A | 2/1931 | Snyder |
| 1,811,574 A | 6/1931 | Barrett |
| 1,863,216 A | 6/1932 | Wordingham |

(List continued on next page.)

FOREIGN PATENT DOCUMENTS

| | | |
|---|---|---|
| AU | 4231978 | 6/1979 |
| BE | 654427 | 1/1965 |
| CH | 560532 | 4/1975 |
| DE | 15550 | 6/1900 |
| DE | 345464 | 12/1921 |
| DE | 513971 | 11/1930 |
| DE | 1166692 | 3/1964 |
| DE | 1962947 | 6/1971 |
| DE | 2060812 | 11/1971 |
| DE | 2748626 | 5/1979 |
| DE | 3445799 | 6/1986 |
| DE | 3829281 | 5/1989 |
| DE | 3911847 | 10/1990 |
| DK | 1204647 | 9/1970 |

(List continued on next page.)

OTHER PUBLICATIONS

Speed Cover Brochure, "The Simple Solution For Those Peak Volume Periods", Highland Supply Corporation, ©1989.

(List continued on next page.)

Primary Examiner—Charles T. Jordan
Assistant Examiner—Francis T. Palo
(74) Attorney, Agent, or Firm—Dunlap, Codding & Rogers (57) ABSTRACT

A plant packaging and covering system including a flexible floral sleeve having a base portion and a skirt portion, and optionally an upper detachable portion which may be sized to surround a plant disposed in a flower pot. The base portion is generally made from two flat panels substantially free of overlapping portions and the skirt portion has a plurality of overlapping portions which allow the skirt portion to expand outwardly from the upper end of the base portion.

18 Claims, 3 Drawing Sheets

U.S. PATENT DOCUMENTS

| | | | |
|---|---|---|---|
| 1,978,631 A | 10/1934 | Herrlinger | 91/68 |
| 2,048,123 A | 7/1936 | Howard | 229/87 |
| RE21,065 E | 5/1939 | Copeman | 93/2 |
| 2,170,147 A | 8/1939 | Lane | 206/56 |
| 2,200,111 A | 5/1940 | Bensel | 229/1.5 |
| 2,278,673 A | 4/1942 | Savada et al. | 154/43 |
| 2,302,259 A | 11/1942 | Rothfuss | 41/10 |
| 2,323,287 A | 7/1943 | Amberg | 229/53 |
| 2,355,559 A | 8/1944 | Renner | 229/8 |
| 2,371,985 A | 3/1945 | Freiberg | 206/46 |
| 2,411,328 A | 11/1946 | MacNab | 33/12 |
| 2,510,120 A | 6/1950 | Leander | 117/122 |
| 2,529,060 A | 11/1950 | Trillich | 117/68.5 |
| 2,621,142 A | 12/1952 | Wetherell | 154/117 |
| 2,648,487 A | 8/1953 | Linda | 229/55 |
| 2,688,354 A | 9/1954 | Berger | 150/28 |
| 2,774,187 A | 12/1956 | Smithers | 47/41 |
| 2,822,287 A | 2/1958 | Avery | 117/14 |
| 2,846,060 A | 8/1958 | Yount | 206/58 |
| 2,850,842 A | 9/1958 | Eubank, Jr. | 47/58 |
| 2,883,262 A | 4/1959 | Borin | 21/56 |
| 2,989,828 A | 6/1961 | Warp | 53/390 |
| 3,022,605 A | 2/1962 | Reynolds | 47/58 |
| 3,080,680 A | 3/1963 | Reynolds | 47/37 |
| 3,094,810 A | 6/1963 | Kalpin | 47/37 |
| 3,121,647 A | 2/1964 | Harris et al. | 118/202 |
| 3,130,113 A | 4/1964 | Silman | 161/97 |
| 3,271,922 A | 9/1966 | Wallerstein et al. | 53/3 |
| 3,293,100 A | 12/1966 | Questel | |
| 3,316,675 A | 5/1967 | Cartwright, Jr. | |
| 3,322,325 A | 5/1967 | Bush | 229/62 |
| 3,376,666 A | 4/1968 | Leonard | 47/41 |
| 3,380,646 A | 4/1968 | Doyen et al. | 229/57 |
| 3,431,706 A | 3/1969 | Stuck | 53/390 |
| 3,508,372 A | 4/1970 | Wallerstein et al. | 53/3 |
| 3,510,054 A | 5/1970 | Sanni et al. | 229/66 |
| 3,512,700 A | 5/1970 | Evans et al. | 229/53 |
| 3,550,318 A | 12/1970 | Remke et al. | 47/37 |
| 3,552,059 A | 1/1971 | Moore | 47/41.12 |
| 3,554,434 A | 1/1971 | Anderson | 229/55 |
| 3,556,389 A | 1/1971 | Gregoire | 229/53 |
| 3,557,516 A | 1/1971 | Brandt | 53/14 |
| 3,620,366 A | 11/1971 | Parkinson | 206/59 |
| 3,681,105 A | 8/1972 | Milutin | 117/15 |
| 3,767,104 A | 10/1973 | Bachman et al. | 229/7 |
| 3,793,799 A | 2/1974 | Howe | 53/32 |
| 3,869,828 A | 3/1975 | Matsumoto | 47/34.11 |
| 3,888,443 A | 6/1975 | Flanigen | 248/152 |
| 3,962,503 A | 6/1976 | Crawford | 428/40 |
| 4,043,077 A | 8/1977 | Stonehocker | 47/66 |
| 4,054,697 A | 10/1977 | Reed et al. | 428/40 |
| 4,091,925 A | 5/1978 | Griffo et al. | 206/423 |
| 4,113,100 A | 9/1978 | Soja et al. | 206/602 |
| 4,118,890 A | 10/1978 | Shore | 47/28 |
| 4,149,339 A | 4/1979 | Hall et al. | 47/67 |
| 4,189,868 A | 2/1980 | Tymchuck et al. | 47/84 |
| 4,216,620 A | 8/1980 | Weder et al. | 47/72 |
| 4,248,347 A | 2/1981 | Trimbee | 206/423 |
| D259,333 S | 5/1981 | Charbonneau | D9/306 |
| 4,265,049 A | 5/1981 | Gorewitz | 47/26 |
| 4,280,314 A | 7/1981 | Stuck | 53/241 |
| 4,297,811 A | 11/1981 | Weder | 47/72 |
| 4,333,267 A | 6/1982 | Witte | 47/84 |
| 4,347,686 A | 9/1982 | Wood | 47/73 |
| 4,380,564 A | 4/1983 | Cancio et al. | 428/167 |
| 4,400,910 A | 8/1983 | Koudstal et al. | 47/84 |
| 4,413,725 A | 11/1983 | Bruno et al. | 206/45.33 |
| 4,508,223 A | 4/1985 | Catrambone | 206/423 |
| D279,279 S | 6/1985 | Wagner | D11/143 |
| 4,546,875 A | 10/1985 | Zweber | 206/0.82 |
| 4,621,733 A | 11/1986 | Harris | 206/423 |
| 4,640,079 A | 2/1987 | Stuck | 53/390 |
| 4,717,262 A | 1/1988 | Roen et al. | 383/120 |
| 4,733,521 A | 3/1988 | Weder et al. | 53/580 |
| 4,765,464 A | 8/1988 | Ristvedt | 206/0.82 |
| 4,771,573 A | 9/1988 | Stengel | 47/67 |
| 4,773,182 A | 9/1988 | Weder et al. | 47/72 |
| 4,801,014 A | 1/1989 | Meadows | 206/423 |
| 4,810,109 A | 3/1989 | Castel | 383/105 |
| 4,835,834 A | 6/1989 | Weder | 29/525 |
| D301,991 S | 7/1989 | Van Sant | D11/149 |
| 4,900,390 A | 2/1990 | Colten et al. | 156/291 |
| 4,941,572 A | 7/1990 | Harris | 206/423 |
| 4,946,290 A | 8/1990 | Matyja | 383/10 |
| 4,980,209 A | 12/1990 | Hill | 428/34.1 |
| 4,989,396 A | 2/1991 | Weder et al. | 53/397 |
| D315,700 S | 3/1991 | Stephens | D11/151 |
| 5,073,161 A | 12/1991 | Weder et al. | 493/154 |
| 5,074,675 A | 12/1991 | Osgood | 383/122 |
| 5,076,011 A | 12/1991 | Stehouwer | |
| 5,105,599 A | 4/1992 | Weder | 53/399 |
| 5,111,638 A | 5/1992 | Weder | 53/397 |
| 5,117,584 A | 6/1992 | Ottenwalder | |
| 5,120,382 A | 6/1992 | Weder | 156/212 |
| 5,152,100 A | 10/1992 | Weder et al. | 47/72 |
| 5,181,364 A | 1/1993 | Weder | 53/397 |
| D335,105 S | 4/1993 | Ottenwalder et al. | D11/164 |
| 5,199,242 A | 4/1993 | Weder et al. | 53/397 |
| 5,205,108 A | 4/1993 | Weder et al. | 53/397 |
| 5,228,234 A | 7/1993 | de Klerk et al. | 47/41.01 |
| 5,235,782 A | 8/1993 | Landau | 47/72 |
| 5,239,775 A | 8/1993 | Landau | 47/72 |
| 5,249,407 A | 10/1993 | Stuck | 53/399 |
| 5,259,106 A | 11/1993 | Weder et al. | 29/469.5 |
| 5,307,606 A | 5/1994 | Weder | 53/410 |
| 5,315,785 A | 5/1994 | Avôt et al. | 47/72 |
| 5,350,240 A | 9/1994 | Billman et al. | 383/104 |
| 5,353,575 A | 10/1994 | Stepanek | 53/461 |
| 5,361,482 A | 11/1994 | Weder et al. | 29/469 |
| 5,388,695 A | 2/1995 | Gilbert | 206/423 |
| 5,428,939 A | 7/1995 | Weder et al. | 53/397 |
| 5,443,670 A | 8/1995 | Landau | 156/191 |
| 5,493,809 A | 2/1996 | Weder et al. | 47/72 |
| D368,025 S | 3/1996 | Sekerak et al. | D9/305 |
| 5,496,251 A | 3/1996 | Cheng | 493/224 |
| 5,496,252 A | 3/1996 | Gilbert | 493/224 |
| 5,526,932 A | 6/1996 | Weder | 206/423 |
| 5,551,570 A | 9/1996 | Shaffer et al. | 206/575 |
| 5,572,849 A | 11/1996 | Weder et al. | 53/399 |
| 5,572,851 A | 11/1996 | Weder | 53/399 |
| 5,575,133 A | 11/1996 | Weder et al. | 53/397 |
| 5,617,703 A | 4/1997 | Weder | 53/413 |
| 5,624,320 A | 4/1997 | Martinez | 472/51 |
| 5,625,979 A | 5/1997 | Weder | |
| 5,647,168 A | 7/1997 | Gilbert | 47/72 |
| 5,647,193 A | 7/1997 | Weder et al. | 53/465 |
| 5,706,605 A | 1/1998 | Alcazar | 47/65.7 |
| 5,715,944 A | 2/1998 | Windisch | 206/423 |
| 5,735,103 A | 4/1998 | Weder | 53/399 |
| 5,758,472 A | 6/1998 | Weder | |
| 5,813,194 A | 9/1998 | Weder | 53/399 |
| D404,684 S | 1/1999 | Shea | D11/164 |
| 5,924,241 A | 7/1999 | Hodge | 47/72 |
| 5,941,020 A | 8/1999 | Weder | 47/72 |
| 5,966,866 A | 10/1999 | Ferguson | 47/41.01 |
| 5,974,730 A | 11/1999 | Chien | 47/41.01 |
| D419,436 S | 1/2000 | Celtorius et al. | D9/305 |
| 6,009,687 A | 1/2000 | Weder | 53/399 |
| 6,047,524 A | 4/2000 | Weder | 53/399 |
| D424,972 S | 5/2000 | Ferguson | D11/143 |
| 6,098,336 A | 8/2000 | Ferguson | 206/423 |

| | | | |
|---|---|---|---|
| 6,129,208 A | 10/2000 | Ferguson | 206/423 |
| 6,129,209 A | 10/2000 | Tchira | 206/423 |
| 6,141,906 A | 11/2000 | Weder | 47/72 |
| 6,182,395 B1 | 2/2001 | Weder | 47/72 |
| 6,183,590 B1 | 2/2001 | Weder | 47/72 |
| 6,598,340 B1 * | 7/2003 | Weder et al. | 47/72 |

FOREIGN PATENT DOCUMENTS

| | | |
|---|---|---|
| EP | 0050990 | 5/1982 |
| EP | 0791543 | 8/1997 |
| FR | 1376047 | 9/1964 |
| FR | 2036163 | 12/1970 |
| FR | 2137325 | 12/1972 |
| FR | 2272914 | 12/1975 |
| FR | 2489126 | 3/1982 |
| FR | 2567068 | 7/1984 |
| FR | 2610604 | 8/1988 |
| FR | 2603159 | 3/1989 |
| FR | 2619698 | 3/1989 |
| GB | 5605 | 5/1885 |
| GB | 2056410 | 3/1981 |
| GB | 2074542 | 11/1981 |
| GB | 2128083 | 4/1984 |
| GB | 2203127 | 10/1988 |
| GB | 2212136 | 7/1989 |
| GB | 2252708 | 8/1992 |
| IT | 224507 | 4/1996 |
| JP | 542958 | 2/1993 |
| JP | 6127555 | 5/1994 |
| JP | 8-19334 | 1/1996 |
| NL | 8301709 | 12/1984 |
| NL | 1000658 | 1/1996 |
| WO | 9315979 | 8/1993 |
| WO | 9712819 | 4/1997 |

OTHER PUBLICATIONS

"Speed Sheets and Speed Rolls" Brochure, Highland Supply Corporation, ©1990.

"Color Them Happy with Highlander Products" ©1992.

"Costa Keeps the Christmas Spirit", Supermarket Floral, Sep. 15, 1992.

"Super Seller", Supermarket Floral, Sep. 15, 1992.

"Halloween", Link Magazine, Sep. 1992.

"Now More Than Ever", Supermarket Floral, Sep. 15, 1992.

Le Plant Sac Advertisement, published prior to Sep. 26, 1987.

"A World of Cut Flower and Pot Plant Packaging" Brochure, Klerk's Plastic Products Manufacturing, Inc., published prior to Mar. 31, 1994, 6 pages.

Chantler & Chantler brochure showing Zipper Sleeve™ and Florasheet®, published prior to Mar. 31, 1994, 2 pages.

"Stand Alone Plastic Bagmaking" brochure, AMI, Atlanta, GA, Feb. 15, 1996, 2 pages.

"Foil Jackets" brochure, Custom Medallion, Inc., Dec., 1996, 2 pages.

"Derwent Abstract" of FR 2610604A. It is noted that the abstract is an incorrect English translation of the contents of the French patent. The French patent does not enable or disclose adhesively attaching the covering to the container. 1988.

"Silver Linings" Brochure, Affinity Diversified Industries, Inc., 1986. The Silver Linings brochure shows a floral sleeve with a closed bottom. The brochure shows, in one embodiment, a vase with flowers inside a "cut flower" sleeve with the sleeve tied with a ribbon about the neck of the vase.

"Special Occasion Printed Highlophane Bags" Brochure, Highland Supply Corporation, 1990, 2 pages.

"Creative Packaging" Brochure, John Henry Company, Sept. 1992.

"Make Highlander Your Headquarters" Brochure, Highland Supply Corporation, 1991.

Weder et al., "Sleeve with a Triangular Lower End", U.S. patent application Publication, Pub. No. US 2002/0112401 A1, Pub. Date: Aug. 22, 2002.

* cited by examiner

FLORAL SLEEVE WITH A SKIRT

CROSS REFERENCE TO RELATED APPLICATION

The present application is a continuation-in-part of U.S. Ser. No. 09/760,877, filed Jan. 16, 2001, now U.S. Pat. No. 6,598,340, issued Jul. 29, 2003, which is hereby expressly incorporated herein by reference in its entirety.

BACKGROUND

This invention generally relates to sleeves, and more particularly, to sleeves used to wrap floral groupings or flower pots containing floral groupings and/or mediums containing floral groupings, and methods of using same.

U.S. Pat. Nos. 5,625,979, 5,749,171, 6,105,310, and 6,151,830, contain subject matter which may be relevant to the invention contemplated and claimed herein and are each is hereby expressly incorporated herein by reference in its entirety.

BRIEF DESCRIPTION OF THE DRAWINGS

FIG. 6 is a cross-sectional view taken through the skirt portion of the flexible floral sleeve of FIG. 5 when the flexible floral sleeve is in a flattened state.

DETAILED DESCRIPTION OF THE INVENTION

The present invention contemplates in a preferred version a preformed flexible floral sleeve having a tubular shape for covering a flower pot having an upper end, a lower end, and an outer peripheral surface. The preformed flexible floral sleeve comprises a base portion and a skirt portion which has a plurality of overlapping portions for enabling the skirt portion to expand outwardly. The preformed flexible floral sleeve may further comprise a detachable upper portion which may be sized to surround and encompass a floral grouping. The upper portion when present may be detachable via perforations, tear strips, weakened areas, or zippers. The upper portion may have one or more apertures or an extended upper portion for serving as a handle or for enabling the flexible floral sleeve to be supported from a support device.

The tubular flexible floral sleeve may form part of a plant package when used in conjunction with a flower pot disposed within a retaining space of the base portion of the preformed flexible floral sleeve, the flower pot having a floral grouping disposed therein, and wherein the flower pot is substantially surrounded and encompassed by the base portion and the floral grouping is at least partially surrounded and encompassed and may be entirely enclosed by the upper portion when it forms a part of the preformed flexible floral sleeve.

Also, the base portion may comprise a bonding material disposed on an inner portion thereof for bondingly connecting the base portion to a flower pot disposed therein. Or, a bonding material may be disposed on an outer portion of the base portion for securing a plurality of crimped folds formed in the base portion.

The base portion of the preformed flexible floral sleeve may be constructed from a first material and the upper portion (when present) may be constructed from a second material different from the first material.

These embodiments and others of the present invention are now described in more detail below. It will be appreciated that the examples provided herein are not intended to limit the scope and extent of the claimed invention but are only intended to exemplify various of the embodiments of the invention contemplated herein.

Figure 4:
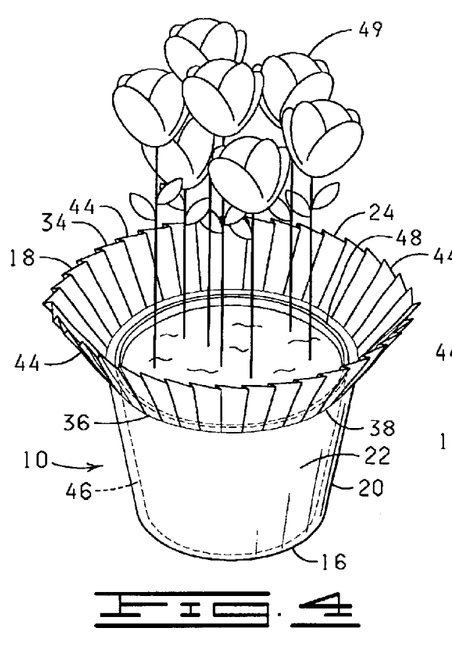
FIG. 4 is a perspective view of the flexible floral sleeve FIG. 1 having a flower pot disposed therein.

Referring now to the drawings, shown in FIGS. 1–4 and designated therein by the general reference numeral 10 is a flexible floral sleeve. The flexible floral sleeve 10 is initially in a flattened state (e.g., FIGS. 1–3) but is flexible and openable to have a tubular shape having an interior space 11 into which a flower pot can be disposed as shown in FIG. 4, for example. The flexible floral sleeve 10 preferably has a frusto-conical shape when opened but may be cylindrical or may even have a rectangular shape when opened.

Figure 1:
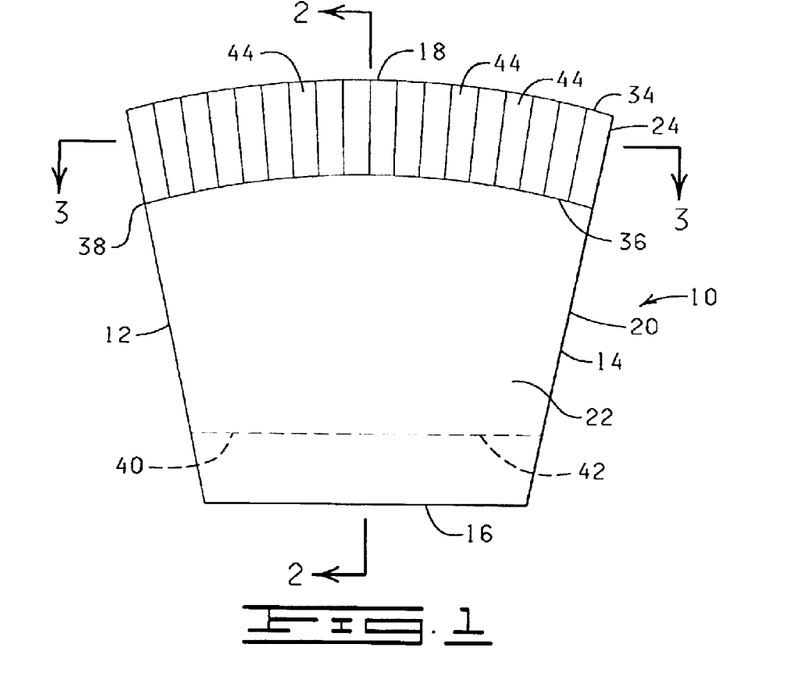
FIG. 1 is an elevational view of a flexible floral sleeve constructed in accordance with the present invention, the sleeve having a base portion and a skirt portion having a plurality of overlapping portions.
Figure 2:
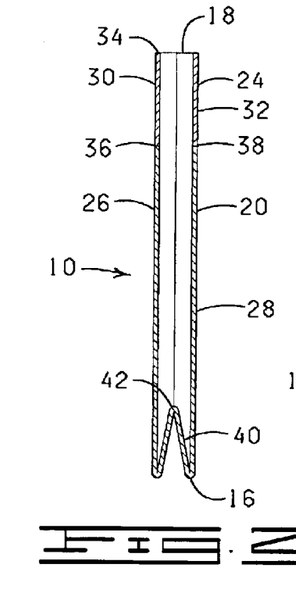
FIG. 2 is a cross-sectional view of the flexible floral sleeve of FIG. 1 taken along line 2—2.
Figure 3:
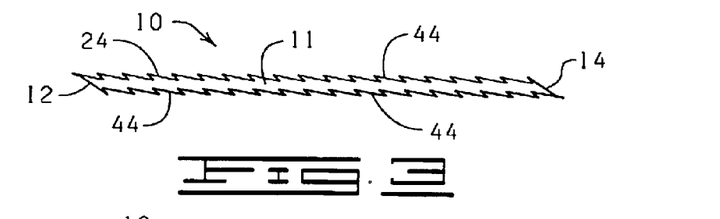
FIG. 3 is a cross-sectional view taken of the flexible floral sleeve of FIG. 1 along line 3—3.

The flexible floral sleeve 10 in the flattened state has a first side 12, a second side 14, a lower end 16, and an upper end 18. The flexible floral sleeve 10 further has a base portion 20 with an outer peripheral surface 22 and a skirt portion 24. As shown in FIG. 2, the base portion 20 has a first panel 26 and a second panel 28 each of which are longitudinally connected along first side 12 and second side 14 of the flexible floral sleeve 10. The skirt portion 24 has a first panel 30 and a second panel 32 which are also connected along first side 12 and second side 14 of the flexible floral sleeve 10. The skirt portion 24 has an upper edge 34 and is connected at a lower end 36 to an upper end 38 of the base portion 20 of the flexible floral sleeve 10. In a preferred version of the invention the lower end 16 of the flexible floral sleeve 10 is sealed and thereby closed, and further may comprise one or more gussets 40 therein, one of which is represented as having a gusset fold 42 in the base portion 20. The skirt portion 24 has a plurality of overlapping portions 44 (also referred to herein as overlapping folds) which are substantially vertically oriented, being more or less perpendicular to the lower end 36 of the skirt portion 24. The overlapping portions 44 of the skirt portion 24 enable the skirt portion 24 to be expanded outwardly, if desired, after the flexible floral sleeve 10 has been opened and a flower pot 46 having an upper rim 48, disposed therein. First panel 26 and second panel 28 of the base portion 20 are generally free of overlapping portions (although the flexible floral sleeve 10 may have a gusset fold 42 in the lower end 16, and side folds (not shown) in first side 12 and second side 14). Flower pot 46 preferably has a botanical item 49 (such as a plant) disposed therein. The flexible floral sleeve 10 (or any other flexible floral sleeve described herein) may be used to contain a botanical item 49 (e.g., a floral bouquet) without a flower pot 46.

Figure 5:
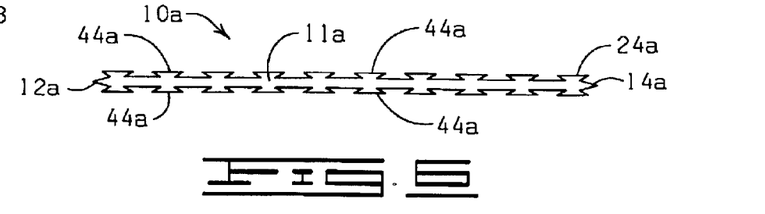
FIG. 5 is a perspective view of an alternative embodiment of a flexible floral sleeve contemplated herein.

Referring now to FIG. 5, another embodiment of a flexible floral sleeve 10a is illustrated. Flexible floral sleeve 10a is provided with a lower end 16a, a base portion 20a and a skirt portion 24a. The flexible floral sleeve 10a is illustrated as being in an open position. In the open position, the flexible floral sleeve 10a is provided with a tubular shape having an interior space 11a into which a flower pot 46 can be disposed. The flexible floral sleeve 10a preferably has a frusto-conical shape when opened, but may be cylindrical or may even have a rectangular shape when opened. The skirt portion 24a has an upper edge 34a and is connected at a lower end 36a to an upper end 38a of the base portion 20a of the flexible floral sleeve 10a. In a preferred version of the invention, the lower end 16a of the flexible floral sleeve 10a is sealed and thereby closed, and further may include one or more gussets (not shown). The skirt portion 24a of the flexible floral sleeve 10a is provided with a plurality of overlapping portions 44a which are substantially vertically oriented so as to be more or less perpendicular to the lower end 36a of the skirt portion 24a of the flexible floral sleeve 10a.

The overlapping portions 44a of flexible floral sleeve 10a (shown in FIG. 6) differ from the overlapping portions 44 of flexible floral sleeve 10 in that the overlapping portions 44a are pleats, whereas overlapping portions 44 of flexible floral sleeve 10 are Z-shaped in cross-section. It will be understood that the overlapping portions 44 and 44a are only two possible embodiments of the skirt portions of the flexible floral sleeves contemplated in the present invention. It is only necessary that the overlapping portions of the skirt portions comprise sufficient excess material to enable the overlapping portions to expand outwardly such that the skirt portions contemplated herein extend angularly from the base portion. For example as shown in FIG. 4, flexible floral sleeve 10 having a base portion 20 and skirt portion 24 with overlapping portions 44, has been opened and a flower pot 46 disposed therein. The skirt portion 24 extends outwardly from the base portion 20 generally above an upper rim 48 of the flower pot 46. Similarly, as shown in FIG. 5, the flexible floral sleeve 10a having a base portion 20a and skirt portion 24a with overlapping portions 44a has been opened and the flower pot 46 disposed therein. The skirt portion 24a extends outwardly from the base portion 20a generally above the upper rim 48 of the flower pot 46. As is evident from FIGS. 4 and 5, in a preferred embodiment of the invention, the lower end 36 or 36a of the skirt portion 24 or 24a, respectively is positioned on the flexible floral sleeve 10, or 10a, respectively so as to be substantially near the upper rim 48 of the flower pot 46 when the flower pot 46 is disposed with the opened flexible floral sleeve 10 or 10a, respectively.

Figures 7, 8:
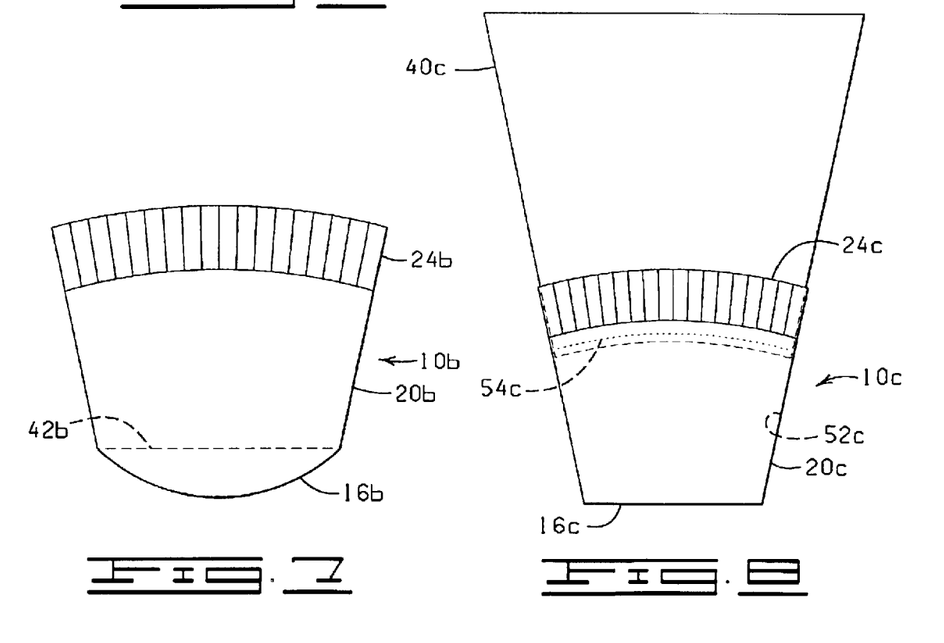
FIG. 7 is an elevational view of a flexible floral sleeve similar to the flexible floral sleeve of FIG. 1 but having a rounded lower end rather than a straight lower end.
FIG. 8 is an elevational view of a flexible floral sleeve similar to the flexible floral sleeve of FIG. 1 but having a detachable upper portion.

Shown in FIG. 7 is another embodiment of a flexible floral sleeve constructed in accordance with the present invention. The flexible floral sleeve 10b comprises a lower end 16b, a base portion 20b and a skirt portion 24b and a gusset fold 42b. Flexible floral sleeve 10b is similar to any of the other flexible floral sleeves contemplated herein except the lower end 16b of the flexible floral sleeve 10b is rounded rather than straight across. Further the lower end 16b may be constructed in the manner shown in U.S. Pat. No. 6,230,441, the specification of which is hereby expressly incorporated herein in its entirety.

Figures 9, 10, 11:
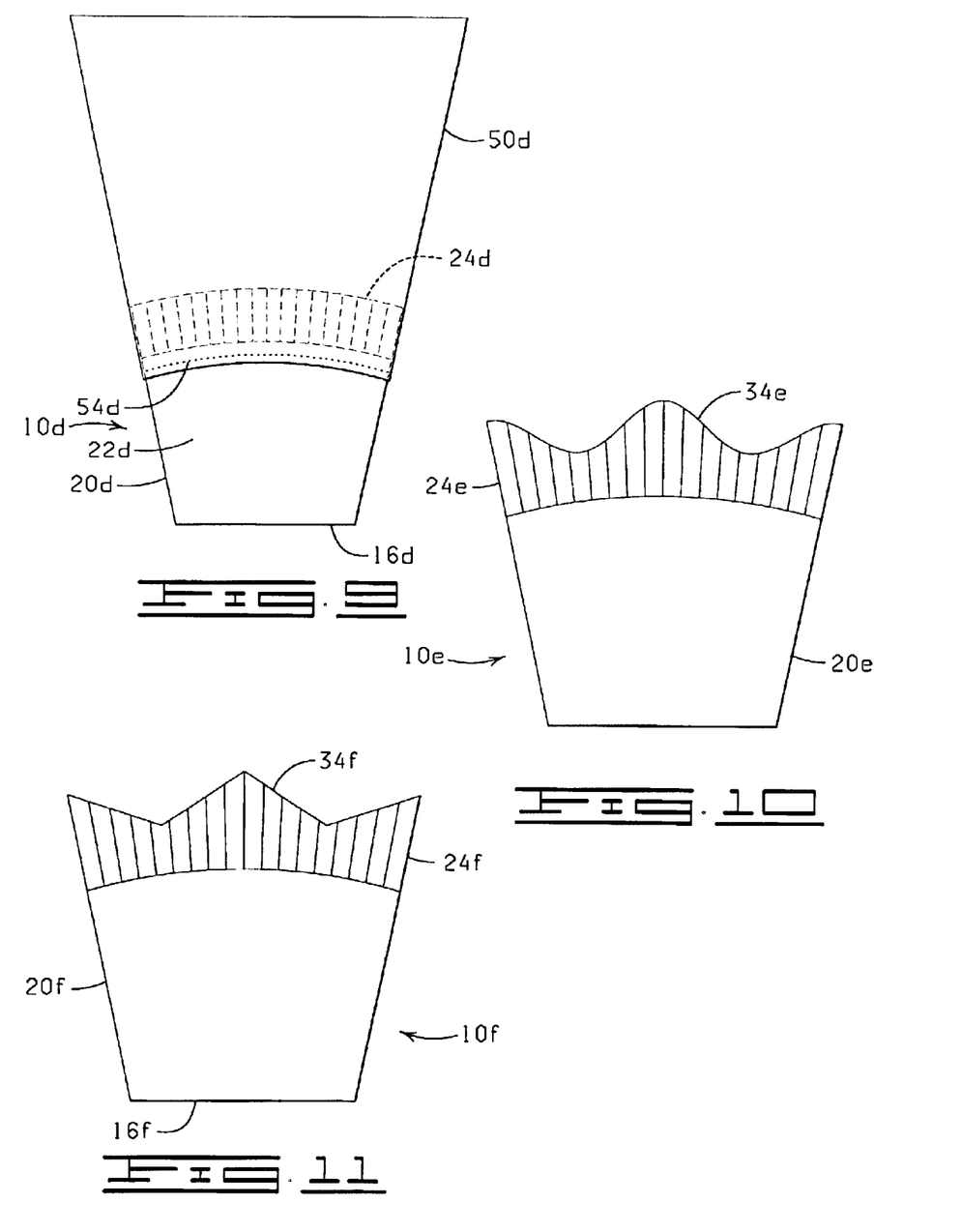
FIG. 9 is an elevational view of another embodiment of a flexible floral sleeve having an upper portion wherein the upper portion is connected to an outer surface of a base portion.
FIG. 10 is an elevational view of a flexible floral sleeve having a curved upper edge in a skirt portion.
FIG. 11 is an elevational view of a flexible floral sleeve having an angular upper edge in a skirt portion.

Alternative embodiments of the present invention are shown in FIGS. 8 and 9. FIG. 8 shows a flexible floral sleeve designated by the general reference numeral 10c which is similar to any of the flexible floral sleeves 10–10b shown above except that the flexible floral sleeve 10c, which comprises a base portion 20c and a skirt portion 24c, also comprises an upper portion 50c which is connected to a portion of an inner peripheral surface 52c of the base portion 20c. The upper portion 40c may be sized to surround and encompass a floral grouping disposed within a flower pot 46 disposed with the flexible floral sleeve 10c, or may only extend a short distance above the skirt portion 24c such that the upper portion 50c can be used to support the flexible floral sleeve 10c from a support device such as a wicket or other support mechanism in a manner well known to a person of ordinary skill in the art. The upper portion 50c can be detached from the base portion 20c via perforations 54c or other detaching element, or it may simply be detached from the base portion 20c in its entirety, either before, or after, a flower pot 46 is disposed within the opened flexible floral sleeve 10c.

Flexible floral sleeve 10d, as shown in FIG. 9, comprises a base portion 20d which has an outer peripheral surface 22d, and a skirt portion 24d, and an upper portion 40d connected to the outer peripheral surface 22d of the base portion 20d. The flexible floral sleeve 10d is substantially the same as flexible floral sleeve 10e, except the upper portion 50d is connected to the outer peripheral surface 22d of the base portion 20d rather than to an inner peripheral surface thereof. The upper portion 50d is detachable from the base portion 20d via perforations 54d or by another type of detaching element, or it may simply be detachable from the base portion 20d in its entirety, either before, or after, a flower pot 46 is disposed within the opened flexible floral sleeve 10d.

It will be apparent to one of ordinary skill in the art that the upper edges of the skirt portion 24–24d of any of the flexible floral sleeves 10–10d contemplated herein may have a pattern which differs from the arcuate pattern of upper edge 34 of the skirt portion 24 of the flexible floral sleeve 10. For example, shown in FIG. 10 is a flexible floral sleeve 10e having a base portion 20e and a skirt portion 24e which has a non-linear upper edge 34e which is curved. Shown in FIG. 11 is a flexible floral sleeve 10f having a base portion 20f and a skirt portion 24f which has an non-linear upper edge 34f which is angular. Upper edges 34e and 34f are but two examples of non-linear edges which may be applied to the skirt portions of any of the flexible floral sleeves characterized or contemplated herein. Other non-linear edge configurations will be readily apparent to one of ordinary skill in the art, for example those shown in FIGS. 2A–2F of U.S. Pat. No. 5,829,225, the specification of which is hereby expressly incorporated herein in its entirety.

The flexible floral sleeves 10–10f in their preferred versions are generally frusto-conically shaped, but instead may be, by way of example but not by way of limitation, cylindrical, a combination of both frusto-conical and cylindrical, or any other shape, as long as the flexible floral sleeves 10–10f function as described herein as noted above. In fact, the flexible floral sleeves 10–10f may comprise any shape, whether geometric, non-geometric, asymmetrical and/or fanciful as long as they function in accordance with the present invention. Any of the flexible floral sleeves contemplated herein may also be equipped with drainage elements (e.g., one or more holes) in the base portions 10–10f thereof or ventilation holes (not shown) in the base portion 10–10f or upper portions, 50c–50d or can be made from permeable or impermeable materials.

The material from which the flexible floral sleeves 10–10f are constructed preferably has a thickness in a range from about 0.1 mil to about 30 mils. Often, the thicknesses of the flexible floral sleeves are in a range from about 0.5 mil to about 10 mils or preferably, in a range from about 1.0 mil to about 5 mils. Preferably, the flexible floral sleeves 10–10f are constructed from a material which is flexible, semi-rigid, rigid, or any combination thereof. The flexible floral sleeves 10–10f may be constructed of a single layer of material or a plurality of layers of the same or different types of materials. Any thickness of the material may be utilized as long as the material functions in accordance with the present invention as described herein. The layers of material comprising the flexible floral sleeves may be connected together or laminated or may be separate layers. Such materials used to construct the flexible floral sleeves are described in U.S. Pat. No. 5,111,637, which is hereby incorporated herein by reference. Any thickness of material may be utilized in accordance with the present invention as long as the flexible floral sleeves 10–10f may be formed as described herein, and as long as the formed flexible floral sleeves 10–10f may contain at least a portion of a flower pot or potted plant or floral grouping, as described herein. Additionally, an insulating material such as bubble film, preferable as one of two or more layers, can be utilized in order to provide additional protection for the item, such as the floral grouping, contained therein.

The flexible floral sleeves 10–10f are constructed from any suitable material that is capable of being formed into a flexible floral sleeve and wrapped about a flower pot and a floral grouping disposed therein. Preferably, the material comprises treated or untreated paper, metal foil, polymeric film, non-polymeric film woven, or nonwoven fabric, or synthetic or natural fabric, cardboard, fiber, cloth, burlap, or laminations or combinations thereof.

The term "polymeric film" when used herein means a film made of a synthetic polymer such as a polypropylene or a naturally occurring polymer such as cellophane. A polymeric film is relatively strong and not as subject to tearing (substantially non-tearable), as might be the case with paper or foil.

In one embodiment, the flexible floral sleeves 10–10f may be constructed from sheets comprising two polypropylene films. The material comprising the flexible floral sleeves 10–10f may be connected together or laminated or may be separate layers. In an alternative embodiment, the flexible floral sleeves 10–10f may be constructed from only one sheet of the polypropylene film.

The materials comprising the flexible floral sleeves 10–10f may vary in color and as described herein consists of designs or decorative patterns which are printed, etched, and/or embossed thereon using inks or other printing materials. An example of an ink which may be applied to the surface of the material is described in U.S. Pat. No. 5,147,706, which is hereby expressly incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. The material may further comprise, or have applied thereto, one or more scents. Each of the above-named characteristics may occur alone or in combination and may be applied to the upper and/or lower surface of the material comprising the flexible floral sleeves 10–10f. Moreover, portions of the material used in constructing the flexible floral sleeves 10–10f may vary in the combination of such characteristics. The material utilized for the flexible floral sleeves 10–10f may be opaque, translucent, transparent, or partially clear or tinted transparent.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule".

The term "growing medium" when used herein means any liquid, solid or gaseous material used for plant growth or for the cultivation of propagules, including organic and inorganic materials such as soil, humus, perlite, vermiculite, sand, water, foam, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet of floral grouping.

The term "propagule" when used herein means any structure capable of being propagated or acting as an agent of reproduction including seeds, shoots, stems, runners, tubers, plants, leaves, roots, or spores.

In accordance with the present invention a bonding material may optionally be disposed on a portion of any of the flexible floral sleeves 10–10f described herein to attach each flexible floral sleeve 10–10f to a flower pot 46 having a floral grouping therein when such a flower pot 46 is disposed within the flexible floral sleeve 10–10f or to assist in closing or sealing the upper portion of the flexible floral sleeve 10–10f or in adhering the flexible floral sleeve 10–10f to the flower pot 46 after the flower pot 46 has been disposed therein. Examples of how a bonding material may be disposed on the flexible floral sleeve 10–10f are shown in U.S. Pat. Nos. 5,493,809 and in 5,625,979, both of which are hereby expressly incorporated herein by reference in their entirety.

The term "detaching element" when used generally herein, means any element or device such as, but not limited to, perforations, tear strips, zippers, and any other devices or elements of this nature known in the art, or any combination thereof, which enable the tearing away or detachment of one object from another. Therefore, while perforations are shown and described in detail herein, it will be understood that tear strips, zippers, or any other "detaching element" known in the art, or any combination thereof, could be substituted therefore and/or used therewith.

The upper portion 50c or 50d of the flexible floral sleeve 10c or 10d, respectively may also have an additional vertical detaching element comprising a plurality of vertical perforations (not shown) for facilitating removal of the upper portion 50c or 50d and which are disposed more or less vertically therein.

It will be understood by a person of ordinary skill in the art that equipment and devices for forming flexible floral sleeves are commercially available, and are well known to a person of ordinary skill in the art. Therefore, further detailed discussion of the construction of the sleeves described herein is not deemed necessary.

However, briefly, the flexible floral sleeves 10–10f described herein may be formed by intermittently advancing two separate webs, one or two webs preformed in the form of a tube, or a single web folded double and sealing the longitudinal sides and bottom of the two facing panels then cutting the flexible floral sleeve 10–10f thus formed from the webs or web. Machines which can form flexible floral sleeves 10–10f from such single webs or pairs of webs are well within the knowledge of one of ordinary skill in the art.

As noted above, any of flexible floral sleeves 10–10f described herein may have an open or closed lower end 16–16f, respectively. When the lower end 16–16f is closed, the lower end 16–16f may have one or more gussets as described elsewhere herein (e.g., gusset 42 of flexible floral sleeve 10) formed therein for allowing expansion of the lower end 16–16f when and object with a broad lower end such as a flower pot 46 is disposed therein. In another embodiment of flexible floral sleeve 10c or 10d, the flexible floral sleeve 10c or 10d may comprise a flap positioned at an upper end of the upper portion 50c or 50d, respectively, which can be folded over and sealed with a bonding material to an adjacent portion of the flexible floral sleeve 10c or 10d near an upper end thereof. Other versions of the flexible floral sleeve (not shown) may comprise ventilation holes or drainage elements (e.g., holes) for allowing movement of gases or moisture to and away from the inner retaining space of the flexible floral sleeve.

The term "flower pot 46" as used herein refers to any type of container used for holding a floral grouping or plant, including vases. Examples of pots, used in accordance with the present invention include, but not by way of limitation, clay pots, wooden pots, plastic pots, pots made from natural and/or synthetic fibers, and/or any combination thereof. The flower pot 46 is adapted to receive a floral grouping in the retaining space thereof. The floral grouping may be disposed within the flower pot 46 along with a suitable growing medium described elsewhere herein, or other retaining medium, such as a floral foam. It will also be understood that a floral grouping, botanical item or propagule and any appropriate growing medium or other retaining medium, may be disposed in the flexible floral sleeve 10–10f without the flower pot 46 for displaying, transporting or cultivating the item disposed within the flexible floral sleeve 10–10f.

It should also be noted that for all embodiments of flexible floral sleeves 10–10f described above which have a bonding material thereon, it may be desirable to have a release material or cover strip (not shown) covering the adhesive or cohesive bonding material disposed on any portion of the flexible floral sleeve 10–10f for preventing the bonding material from bonding to another surface until the desired time. Further, in each of the cases described herein wherein a flexible floral sleeve 10–10f is applied to a flower pot 46 or a flower pot 46 which is covered, the flexible floral sleeve 10–10f may be applied thereto either by depositing the flower pot 46, or flower pot 46 which is covered, downwardly into the open retaining space of the flexible floral sleeve 10–10f, or the flexible floral sleeve 10–10f may be brought upwardly about the flower pot 46 or from below the flower pot 46.

It should be further noted that various features of the versions of the present invention such as closure bonding areas, support apertures, handles or handle apertures, additional perforations, drainage holes, ventilation holes, combinations of material may be used alone or in combination as elements of any of the embodiments described above herein.

Changes may be made in the construction and the operation of the various components, elements and assemblies described herein or in the steps or the sequence of steps of the methods described herein without departing from the spirit and scope of the invention as defined in the following claims.

What is claimed is:

1. A flexible floral sleeve initially having a flattened state, comprising:
    a base portion sized to contain a flower pot or botanical item, and comprising a first panel and a second panel, and having an upper end and a lower end, and wherein each of the first panel and the second panel is substantially free of overlapping folds or pleats; and
    a skirt portion having an upper end and a lower end and extending beyond the upper end of the base portion, and the skirt portion comprising a plurality of overlapping portions and wherein the skirt portion can be expanded outwardly from the base portion when the flexible floral sleeve is converted from the flattened state to an opened state.

2. The flexible floral sleeve of claim 1 further comprising a gusset in the lower end of the base portion.

3. The flexible floral sleeve of claim 1 wherein the base portion has a tapered shape.

4. The flexible floral sleeve of claim 1 wherein the upper end of the skirt portion has a non-linear upper edge.

5. The flexible floral sleeve of claim 1 wherein the base portion has a bonding material disposed upon an inner peripheral surface or upon an outer peripheral surface thereof.

6. The flexible floral sleeve of claim 5 wherein the bonding material is an adhesive or cohesive bonding material.

7. The flexible floral sleeve of claim 1 wherein the skirt portion is connected to the base portion only at the lower end of the skirt portion.

8. A flexible floral sleeve initially having a flattened state, comprising:
    a base portion sized to contain a flower pot or botanical item, and comprising a first panel and a second panel, and having an upper end and a lower end, and wherein each of the first panel and the second panel is substantially free of overlapping folds or pleats;
    a skirt portion having an upper end and a lower end and extending beyond the upper end of the base portion, the skirt portion comprising a plurality of overlapping portions and wherein the skirt portion can be expanded outwardly from the base portion when the flexible floral sleeve is converted from the flattened state to an opened state; and
    an upper portion which is detachable from the base portion or skirt portion.

9. The flexible floral sleeve of claim 8 wherein the upper portion which is detachable is adapted to support the flexible floral sleeve from a support device.

10. The flexible floral sleeve of claim 8 wherein the upper portion which is detachable is sized to substantially surround and encompass a floral grouping.

11. The flexible floral sleeve of claim 8 wherein the upper portion which is detachable is connected to an inner peripheral surface of the base portion.

12. The flexible floral sleeve of claim 8 wherein the upper portion which is detachable is connected to an outer peripheral surface of the base portion.

13. The flexible floral sleeve of claim 8 further comprising a gusset in the lower end of the base portion.

14. The flexible floral sleeve of claim 8 wherein the base portion has a tapered shape.

15. The flexible floral sleeve of claim 8 wherein the upper end of the skirt portion has a non-linear upper edge.

16. The flexible floral sleeve of claim 8 wherein the base portion has a bonding material disposed upon an inner peripheral surface or upon an outer peripheral surface thereof.

17. The flexible floral sleeve of claim 16 wherein the bonding material is an adhesive or cohesive bonding material.

18. The flexible floral sleeve of claim 8 wherein the skirt portion is connected to the base portion only at the lower end of the skirt portion.

* * * * *